(12) United States Patent
Wald

(10) Patent No.: US 9,547,708 B2
(45) Date of Patent: Jan. 17, 2017

(54) METHOD AND SYSTEM FOR DATABASE LICENSING

(75) Inventor: Joe Wald, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 2471 days.

(21) Appl. No.: 11/397,486

(22) Filed: Apr. 3, 2006

(65) Prior Publication Data

US 2006/0224522 A1 Oct. 5, 2006

Related U.S. Application Data

(60) Provisional application No. 60/667,351, filed on Apr. 1, 2005.

(51) Int. Cl.
*G06F 17/30* (2006.01)
*G06F 21/10* (2013.01)

(52) U.S. Cl.
CPC ..... *G06F 17/30592* (2013.01); *G06F 17/3056* (2013.01); *G06F 21/105* (2013.01)

(58) Field of Classification Search
None
See application file for complete search history.

(56) References Cited

U.S. PATENT DOCUMENTS

| | | | | |
|---|---|---|---|---|
| 5,448,727 A * | 9/1995 | Annevelink | ...... | G06F 17/30595 |
| 5,832,206 A * | 11/1998 | De Jesus | ...... | G06F 21/31 341/26 |
| 6,047,242 A * | 4/2000 | Benson | ...... | G06F 21/10 380/277 |
| 6,925,477 B1 | 8/2005 | Champagne et al. | | |
| 6,931,390 B1 | 8/2005 | Zait et al. | | |
| 7,076,468 B2 * | 7/2006 | Hillegass | ...... | G06F 21/10 705/56 |
| 7,146,376 B2 | 12/2006 | Dettinger et al. | | |
| 2001/0011253 A1 * | 8/2001 | Coley | ...... | G06F 21/10 705/59 |
| 2002/0112171 A1 * | 8/2002 | Ginter | ...... | G06F 21/10 713/185 |
| 2003/0204597 A1 * | 10/2003 | Arakawa et al. | ...... | 709/226 |
| 2004/0172367 A1 * | 9/2004 | Chavez | ...... | G06Q 10/087 705/59 |
| 2005/0038784 A1 * | 2/2005 | Zait et al. | ...... | 707/5 |
| 2005/0086213 A1 * | 4/2005 | Terao | ...... | 707/3 |

(Continued)

*Primary Examiner* — Tsan-Yu J Huang
(74) *Attorney, Agent, or Firm* — Colin L. Wier; Alec McGinn; Mitch Blakely

(57) ABSTRACT

A licensing service for a data repository, including software instructions to perform: dividing a data store into a plurality of domains; assigning a license number to at least one of the plurality of domains; and checking a license of a user with the assigned license number. A method to expedite license checking by statistically sampling a subset of probes to check the license. A method for allowing a third party application to access a data store without a license, including: assigning a license management tool feature name to the third party application; adding the license management tool feature name to a program in the data store; starting a session of the third party application; having the third party application call an embedded licensing application program interface; and checking the license using the embedded licensing application program interface.

20 Claims, 7 Drawing Sheets

(56) References Cited

U.S. PATENT DOCUMENTS

2005/0119994 A1 6/2005 Matsunami et al.
2005/0187974 A1 8/2005 Gong
2006/0020619 A1 1/2006 Netz et al.
2006/0143464 A1 6/2006 Ananthanarayanan et al.

* cited by examiner

METHOD AND SYSTEM FOR DATABASE LICENSING

CROSS-REFERENCE TO RELATED APPLICATIONS

This application claims priority of U.S. Provisional Patent Application Ser. No. 60/667,351 filed on Apr. 1, 2005. The Provisional Application is hereby incorporated by reference.

BACKGROUND OF INVENTION

Field of the Invention

The invention relates generally to database management. More particularly, embodiments relate to methods to manage database licensing.

Background Art

In many industry applications, a large amount of data is generated, collected, and deposited to a database. For example, in the oil and gas industry especially during oil Exploration and Production (E&P), geological formation data are collected in the exploration stage. These geological formation data are stored for the use of making decisions on where to drill. In the production stage, data on oil and gas flow rates are collected to monitor the production processes. A large investment is often needed to build a database. It is essential that all the data are stored and managed in such an efficient way that subsequent search and use of the data are facilitated. Besides efficiently organizing data, a Database Management Systems (DBMS) often needs a licensing service in order to grant licensed users access to databases efficiently, while denying unlicensed user accesses, as the data contain confidential and/or priority information and possibly other valuable intellectual property.

The market of local DBMS is dominated by client-server products called SQL Servers, developed by Sybase and Microsoft. SQL Servers are based on the Structural Query Language (SQL). SQL Servers are popular in low-end applications in small businesses and local offices where the local DBMS run on stand-alone desktops and laptops. This is because SQL Servers are of low cost, simple administration, and good performance, as a result of being based on the popular Windows™ NT technology. On the other hand, Oracle™ dominates the high-end database market (such as corporate and national repositories) because of its high scalability, reliability, and a wide assortment of features. Oracle and SQL Servers have many differences, and it is often difficult to support applications on both Oracle and SQL Server. Software vendors (and hence users) are often forced to choose one platform over the other. Migrating data from one platform to another and merging data may require extensive effort. Further, a customized DBMS is often required to run on different platforms.

In the following context, a database instance and a DBMS are collectively referred to as a "data repository". A database instance can have many data stores. A data store contains a collection of tables and views. A table is an array of data. A view is a particular way of looking at a table, and the change of a view does not affect the physical organization of a table. Users are typically not granted access to the tables directly. They are granted access to views of the tables. A view in a data store provides a standard interface to that data store. Tables and views can be private or public. Conventionally, for a database entity XYZ, a private implementation of a table is represented with XYZ_, and a public interface view is represented with XYZ. The data in a data repository are usually related among themselves, and such a relation is usually defined by a logical specification in the form of a "data model."

In Oracle and SQL Server, as well as in other commercial DBMS, as long as a user has a valid license and the license is checked out, the user is granted access to the whole database. For example, the Oracle database controls user access through log-on and log-off triggers, which are SQL procedures (i.e., code segments) that initiate an action of granting or denying access to the whole database when a user attempts to log on. However, a database may include many subsets of entity types in the data model, referred to as "domains." For example, in an oilfield service setting, the domains include Drilling, Production, Log, Reservoir, Seismic, and Well. These domains could have very different sizes. For example, the Well domain could be relatively inexpensive because it is relatively small and simple. The Production domain could be large and complex and hence very expensive to develop.

Traditional schemes for database licensing allow a licensed user to access the whole database, as shown in prior art FIG. 1. The database (100) includes one or more domains (Domain A (101), Domain B (102), Domain C (103), Domain D (104), Domain E (105)), and is protected by a security shell (110). User N (106) with a valid license (License XYZ (107)) is allowed to cross the security shell (110) and thus have unrestricted access to all the domains (Domain A (101), Domain B (102), Domain C (103), Domain D (104), Domain E (105)) associated with the database (100). User B (108) without a valid license (or a license to an unsupported database) is not allowed to cross the security shell (100) and therefore has no access to the domains associated with the database (100). Accordingly, a user is either given complete access or none at all.

Allowing licensing by specific domains (e.g., a subset of one or more of Domain A (101), Domain B (102), Domain C (103), Domain D (104), Domain E (105)) in a conventional manner requires a DBMS to check for each procedure, referred to as a "probe", that attempts to access each of the one or more domains to determine whether a domain-specific license is checked out for that user. Because of the complexity and scale of a database, many probes are executed when a user attempts to access the database, and subsequently many license checks are required.

When managing a large data repository, it is often necessary to allow third party applications to access the database. Many third party applications may need to execute in conjunction with the database (and therefore necessarily need a license to access the database). In conventional practice, the licensing fees for such limited third party application usage are the same as that for a user with direct access to the database. However, these third party applications do not provide open access for users to the complete database, so charging a full licensing fee is not warranted.

SUMMARY OF INVENTION

In general, in one aspect, the invention relates to a data repository, comprising: a data store comprising a plurality of domains; a data dictionary comprising a meta-table and means to generate the data store, wherein the meta-table is generated from a logical specification defining the data repository; and a licensing service capable of licensing a domain of the data store to a user.

In general, in one aspect, the invention relates to a method for licensing a domain of a data store to a user, comprising: dividing the data store into a plurality of domains; assigning a different license number to each of the plurality of domains; and checking whether the user has a valid domain license with the assigned license number.

In general, in one aspect, the invention relates to a method for allowing a third party application to access a data store without a license, comprising: assigning a license management tool feature name to the third party application; adding the license management tool feature name to a program in the data store; starting a session of the third party application; having the third party application call an embedded licensing application program interface; and verifying the license using the embedded licensing application program interface.

In general, in one aspect, the invention relates to a computer readable medium for executing software instructions on a processor to perform: dividing a data sore into a plurality of domains; assigning a license number as an attribute to a domain; and determining whether a user has a valid license with the assigned license number to access the domain corresponding to the assigned license number.

In general, in one aspect of the invention, the invention relates to a computer readable medium for executing software instructions on a processor for a third party licensing, wherein the software instructions comprise: assigning a license management tool feature name to a third party application; adding the license management tool feature name to a program in the data store; starting a session of the third party application; having the third party application call an embedded licensing application program interface; and checking the license using the embedded licensing application program interface.

Other aspects and advantages of the invention will be apparent from the following description and the appended claims.

DETAILED DESCRIPTION

Figure 1:
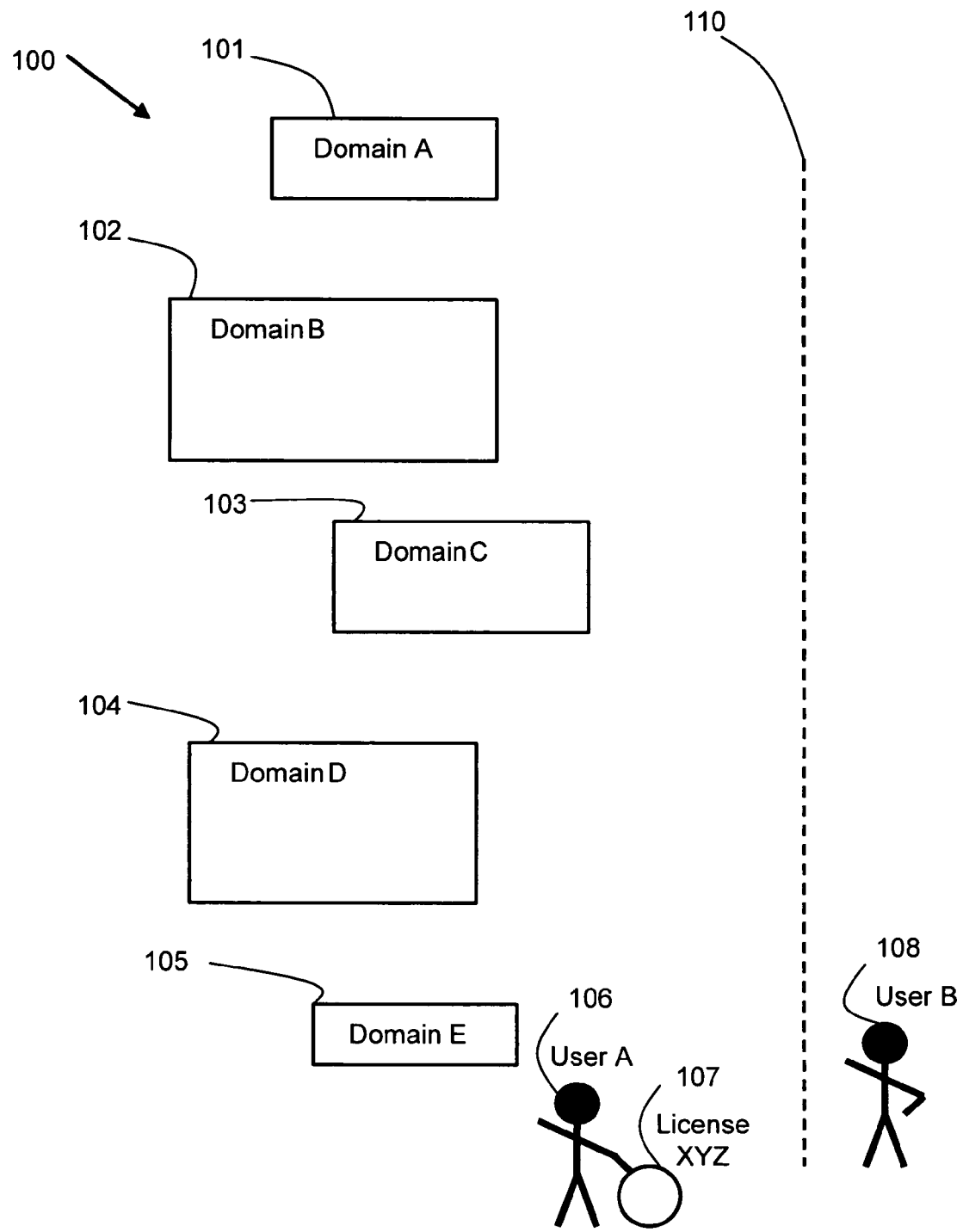
FIG. 1 shows a conventional database licensing scheme.

Exemplary embodiments of the invention will be described with reference to the accompanying figures. Like elements in the figures are denoted by like reference numerals for consistency.

In the exemplary embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one aspect, one or more embodiments of the invention relate to methods for database licensing. Specifically, the invention relates to a licensing service capable of separately licensing one or more domains of a data store to a user. A licensing service, in accordance with one embodiment of the invention, involves software instructions to divide a data store into multiple domains, assign a license number to one or more of the domains, and checking a license with the assigned license number for a user probe. Accordingly, users may access database domains through domain licensing rather than full licensing to the whole database.

In one aspect, one or more embodiments of the invention relate to methods for allowing third party applications to run on a database using embedded licensing. Some embodiments of the invention relate to statistical methods to check the license in a subset of all probes. Controlling a user's access to certain domains allows the capability of enforcing separate licensing of domains can provide a client with a more affordable license if this client intends to access only a small domain. Specifically, a method for allowing third party applications to run on a database using embedded licensing, in accordance with one or more embodiments of the invention, involves: assigning a license management tool feature name to the third party application, adding the license management tool feature name to a program in the data store, starting a user session of the third party application, having the third party application call an embedded licensing application program interface, and checking the license using the embedded licensing application program interface.

In one aspect, one or more embodiments of the invention relate to methods for expediting license checking by using statistically sampling methods. A method, in accordance with one or more embodiments of the invention, involves generating a random number for each probe, comparing the random number with a selected value, and if the random number equals the selected value then perform a license checking for the probe.

In one or more embodiments of the invention, a customized data repository is used for implementing one or more aspects of the invention summarized above and described below. In one or more embodiments of the invention, this repository is used for applications in petroleum E&P, however one skilled in the art will appreciate that the architecture of the system is not limited to this application.

Figure 2:
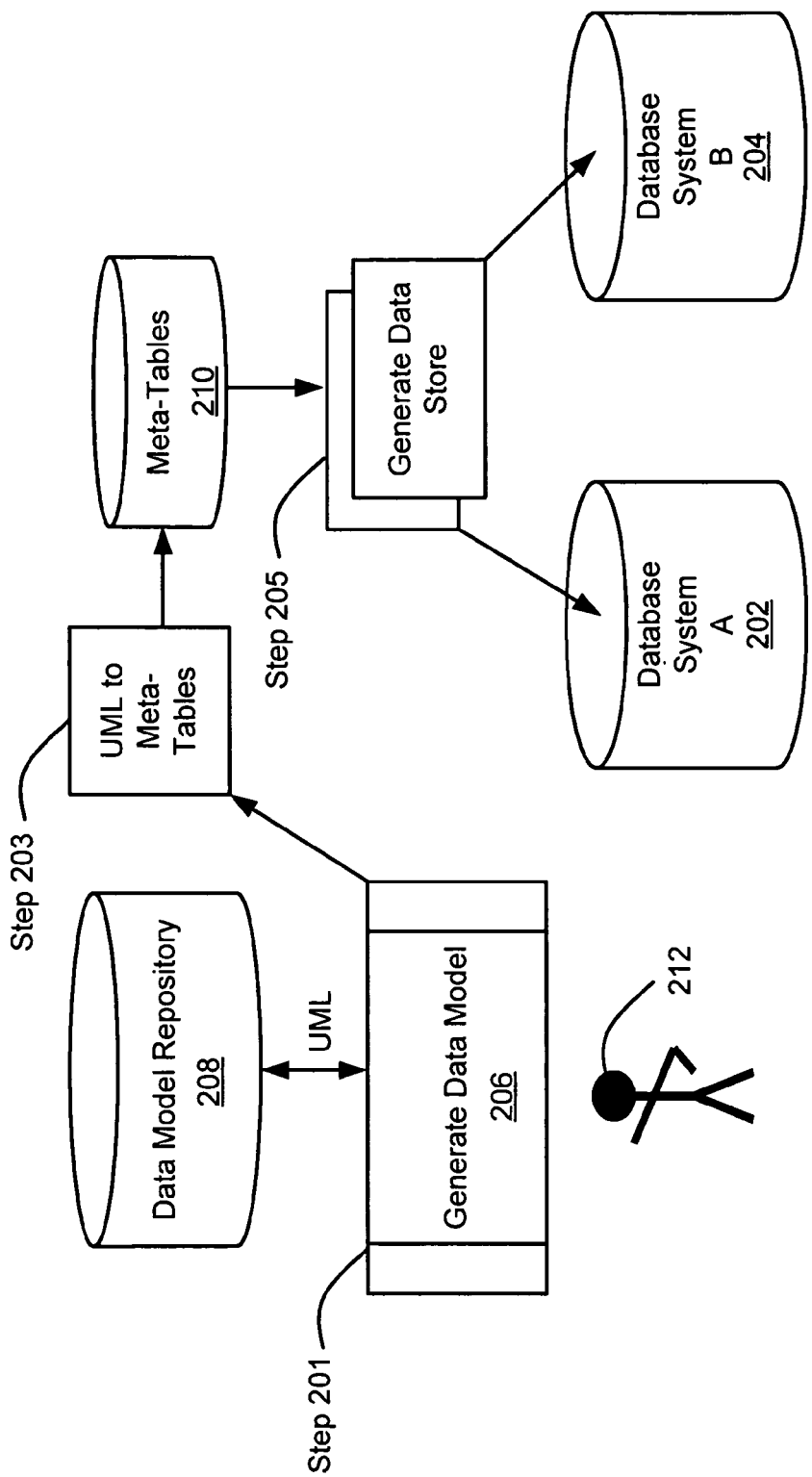
FIG. 2 shows a system diagram of components of a data repository in accordance with one or more embodiments of the invention.

FIG. 2 shows a system diagram of components of a data repository in accordance with one or more embodiments of the invention. In one or more embodiments, the data repository (200) of the invention is designed to execute on a variety of underlying database products, including Database System A (202) and/or Database System B (204). In one or more embodiments of the invention, the data repository (200) is built using a commercial tool, such as QDesigner, which is based on the Unified Modeling Language™ (UML). The high-level specification of the data model, which is generated in UML in Step 201, is stored in a UML repository (208). A script (e.g., a Visual Basic script) is used to translate the UML specification of the data model into a relational representation in meta-tables (210) (Step 203). The meta-tables (210) are used as the basis to generate distinct implementations of data stores on the underlying database products (Step 205), such as Database System A (202) and/or Database System B (204) (e.g., Oracle and/or SQL Server). In one or more embodiments, the invention provides optimal performance and similar behavior on both of the database products. Further, in one embodiment of the invention, the meta-tables (210) are also used to automatically generate HTML documentation of the data model. A user (212) may have access to views (not shown) in the data repository (208).

In the examples provided below, the methods of database licensing in are implemented and described using a particular format. Portions of computer code and or pseudo-code are also used to show embodiments of the present invention in a specific form. However, those skilled in the art will recognize that, these methods do not depend on a particular platform, a particular data repository, or a specific programming language to function. Rather, embodiments in accordance with the present invention can be applied to many different DBMS, using many different ways to program computer software instructions with various types of programming languages and implementations.

In order to better understand embodiments of the present invention, it is helpful to describe the exemplary data repository referred to below as Seabed. Seabed has services embedded in the database, allowing optimal performance by minimizing context switching, i.e., minimizing network traffic between a client and a server. In one embodiment of the invention, the database is accessible locally as well as remotely.

Seabed can support the same set of applications on various database products, such as Oracle and SQL Server, by providing the same data model and similar behaviors on both platforms. In one or more embodiments, Seabed is intended to be applied to various technology fields by being adapted for deployment on laptops on sites of oil wells, in small office environments, as well as on mainframes for large-scale data repositories. In addition, Seabed provides open access for third party applications. In essence, Seabed involves a logical data model and a physical implementation of that data model on a variety of database products, including both Oracle and SQL Server, in a manner described above in relation to FIG. 2.

The terminology used by Oracle is different from that used by SQL Server. Accordingly, for the purposes of the present application, the term "account" refers to a user on Oracle, and refers to a database on SQL Server. The term "user" refers to the login account of a person on Oracle, and refers to a login into a session in SQL Server. Also, when referring to a database instance, one skilled in the art will appreciate that each instance can have many users.

Figure 3:
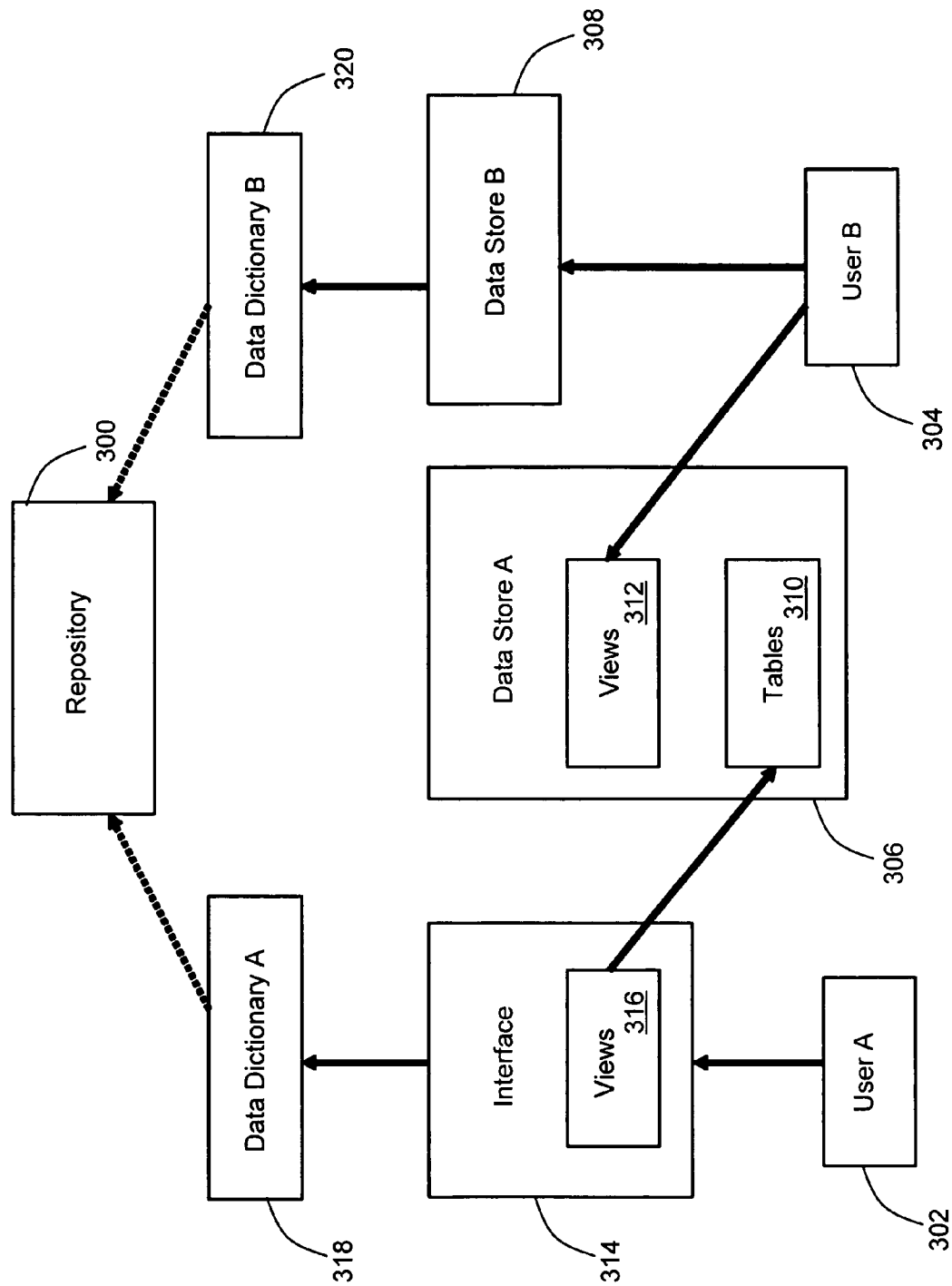
FIG. 3 shows a system diagram of a high level architecture of a data repository in accordance with one or more embodiments of the invention.

FIG. 3 shows a system diagram of a high level architecture of a data repository, such as Seabed, in accordance with one or more embodiments of the invention. An important feature of the data repository (300) of the present invention is that a user (User A (302), User B (304)) always logs in as him/herself with a tag identifying this user (User A (302), User B (304)). The user (User A (302), User B (304)) does not log in using simple authentication (i.e., by simply being given privileges to cross a security shell protecting the database). The same log in procedure and technique also applies when using a third party application to access the data repository (300) (versus logging directly to the repository). That is, if the user (User A (302), User B (304)) logs in properly, the user (User A (302), User B (304)) has exactly the same database rights when using an application as when directly using SQL.

A data store (Data Store A (306), Data Store B (308)) (sometimes called a project) is an account. The data store (Data Store A (306), Data Store B (308)) contains a collection of tables (310) and views (312). Users (User A (302), User B (304)) are not granted access to the tables (310) directly; instead, the users (User A (302), User B (304)) are granted access to views (312) over tables (310). The views (312) in a data store (Data Store A (306), Data Store B (308)) provide the standard interface to that data store (Data Store A (306), Data Store B (308)).

In the data repository (300), an auxiliary interface (314) is also an account. The auxiliary interface (314) contains a collection of views (316) of the tables (310) in a data store (i.e., Data Store A (306)). Users (User A (302), User B (304)) can also be granted access to the views (316) in an auxiliary interface (314). An auxiliary interface (314) is intended to support customized services. For example, in a data store, all measurement data (such as mass) are stored using Système International units (e.g., kg). The standard interface does not provide a built-in unit conversion service. However, in one or more embodiments of the invention, auxiliary interfaces can be defined to support unit conversion. The same data store can have auxiliary interfaces that support the English unit system, a Production unit system, or a customized unit system. One skilled in the art will appreciate that each data store (Data Store A (306), Data Store B (308)) may have zero or more auxiliary interfaces (314).

Continuing with FIG. 3, a data dictionary (e.g., Data Dictionary A (318), Data Dictionary (320)) is also treated as an account. Each data dictionary (Data Dictionary A (318), Data Dictionary (320)) contains meta-tables (not shown) that describe a particular version of the data model. Every data store (Data Store A (306), Data Store B (308)) and interface (314) is generated from a particular data dictionary (e.g., Data Dictionary A (318), Data Dictionary (320)). A data dictionary (Data Dictionary A (318), Data Dictionary (320)) also contains reference tables that are shared by all data stores (Data Store A (306), Data Store B (308)) of that particular version. One skilled in the art will appreciate that because the data repository (300) of the present invention allows a database instance to contain more than one data dictionary, clients can upgrade data stores individually from one version to another and can safely extend one data dictionary without impacting data stores generated from other data dictionaries.

A system account, referred to as "SDS_Sys" on both Oracle and SQL Server platforms, is an account of the data repository (300) that keeps track of all the data stores (Data Store A (306), Data Store B (308)), interfaces (314), and data dictionaries (Data Dictionary A (318), Data Dictionary (320)) in a single database instance. One skilled in the art will appreciate that a database instance can have only one system account and that the system account contains stored procedures for securely managing the privileges of a user (User A (302), User B (304)).

Before database licensing is enforced, any user (User A (302), User B (304)) can be a regular user in the sense that users need not be created by the system. This allows user management to be handled more easily by systems built on top of the data repository. It also allows users created by a database administrator or third party tool to access the data stores (Data Store A (306), Data Store B (308)) subject to the privileges managed by system.

One skilled in the art will appreciate that most of the services in the data repository are available by making simple calls using SQL, such as select, insert, update, and delete. These services are implemented via views, instead of triggers on views and table triggers within Oracle and/or SQL Server. In one or more embodiments of the invention, objects and underlying tables are generated automatically by the meta-system. Some of the services, such as data merge and data transfer, are available only by invoking stored procedures in the database.

Figure 4:
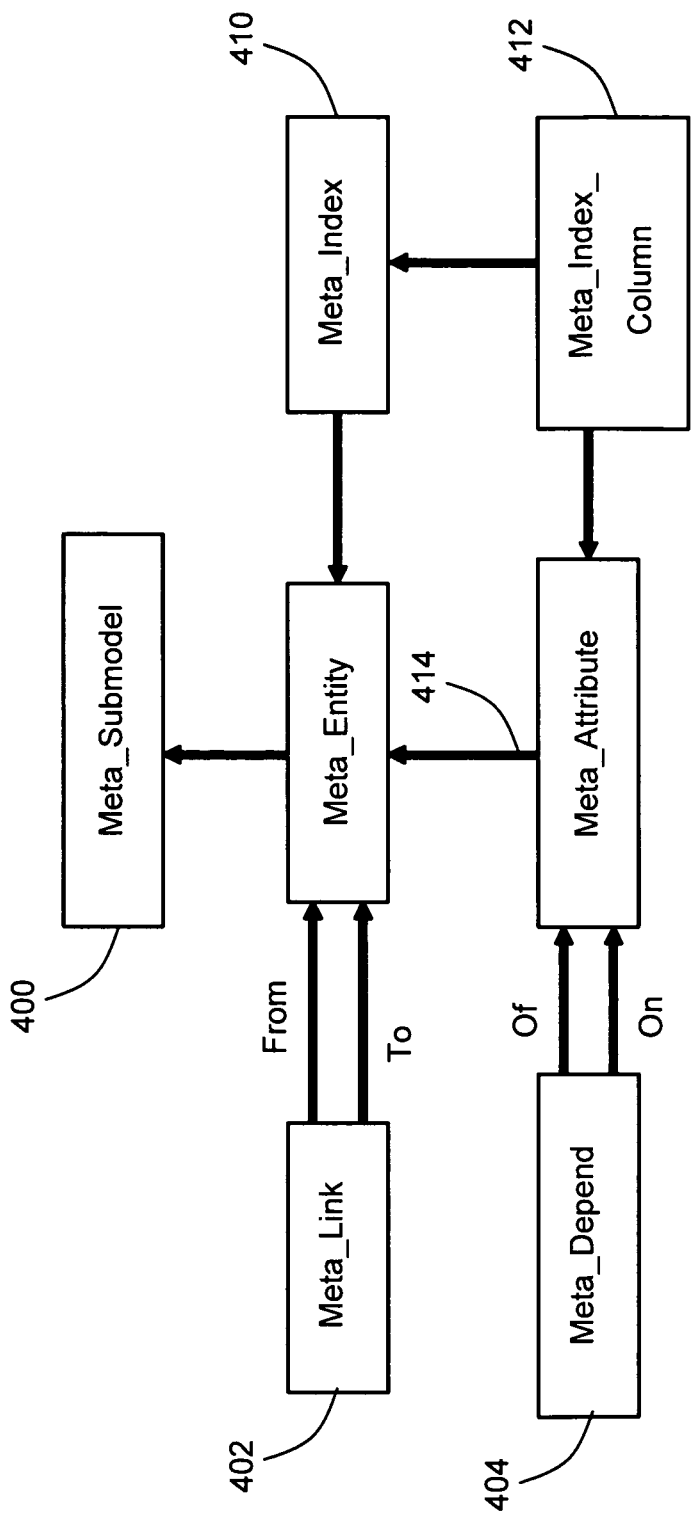
FIG. 4 shows a diagram of entities and relationships of meta-model for the data repository in accordance with one or more embodiments of the invention.

FIG. 4 shows a diagram of entities and relationships of meta-model for the data repository in accordance with one or more embodiments of the invention. Specifically, the data repository of the present invention uses meta-tables to describe a data model and generates tables and views from the meta-tables. Meta-tables are also used to configure services implemented in the database via table triggers and instead of triggers. As shown in FIG. 4, the boxes (400, 402, 406, 408, 410, 412) contain the names of the meta-tables. An arrow (e.g., 414) from one box to another box represents a reference (e.g., there is a reference from Meta_Attribute (408) to Meta_Entity (406)). HTML (web-based) documentation for all entity types in the data model is generated automatically from the meta-tables. The web-based document has many live links, which allow convenient navigation.

The repository of the present invention provides open access via standard SQL. Moreover, the invention ameliorates the differences between Oracle and SQL Server so that the same set of applications can execute on both platforms. The implementation of the invention in both Oracle and SQL Server is described below. One skilled in the art will appreciate that while the implementation of the invention described below is described with regard to only Oracle and SQL Server, the implementation may be performed in a similar fashion on any database platform or management system (e.g., Sybase, Informix, DB2, Oracle, SQL Server, or other similar DBMS).

Domain Licensing On Oracle

In accordance with one or more embodiments of the invention, a table is used to describe data model domains and the table contains a column of license numbers identifying each domain. In particular, every entity in the data repository is described by the Meta_Entity table (shown in FIG. 4 and described above). This table contains a license attribute that specifies the combination of licenses required for a given entity. Based on the value of the license number for an entity type, the data repository generates views that check whether the appropriate licenses are checked out when a select statement is issued on the view. Likewise, the data repository generates table triggers ensuring that the licenses are valid and checked out before an operation is performed.

In accordance with one or more embodiments of the invention, an implementation of an SDS_License table in the data repository system account including data model domains and license numbers is given below:
SQL>select*from SDS_License;

| RANK | NAME | LICENSE | DESCRIPTION |
|------|------|---------|-------------|
| 1 | SDS_Central | 1 | Central |
| 2 | SDS_Drilling | 2 | Drilling |
| 3 | SDS_Log | 4 | Log |
| 4 | SDS_Production | 8 | Production |
| 5 | SDS_Reservoir | 16 | Reservoir |
| 6 | SDS_Sample | 32 | Sample |
| 7 | SDS_Seismic | 64 | Seismic |
| 8 | SDS_Well | 128 | Well |

In the above table, the license numbers are powers of two and uniquely identify all the domains within the data model.

During a procedure to generate a data store, the meta-system generates interface views that check for licenses according to the specification in the Meta_Entity table. For example, the view generated for the Well entity (SDS_Well) for an implementation in Oracle is as follows:

```
Create or replace view WELL as
    select ID,
        Insert_Date,
        Insert_User,
        ...,
        ...,
        UWI
            from Well_
    where 1 = (case when BitAnd(Id,127) <> RAND(127) then 1
        else SDS_Sys.SDS_Public.Check_License(128))
    end);
```

Statistical License Check

The "where" clause in the above exemplary code contains a statistical logic for license checking. Making a check for every probe that attempts to access the data store would be very time consuming, and the system performance would suffer dramatically. In one or more embodiments of the invention, a statistical method is used to sample a fraction of probes for which license checks are performed. The exemplary code above compares a number 127, which is the Well domain license number (128) minus 1, with a random number RAND (127) that is evenly distributed between 0 and 127, resulting in one check out of every 128 probes. Those of ordinary skill in the art will recognize that, the exact range of the random number, which determines how frequent the license is checked, and the exact procedures to implement such a random check, can be implemented in many different ways. One skilled in the art will appreciate that the frequency alternatively be controlled on a per entity basis by appropriate annotation in the Meta_Entity table.

Figure 5:
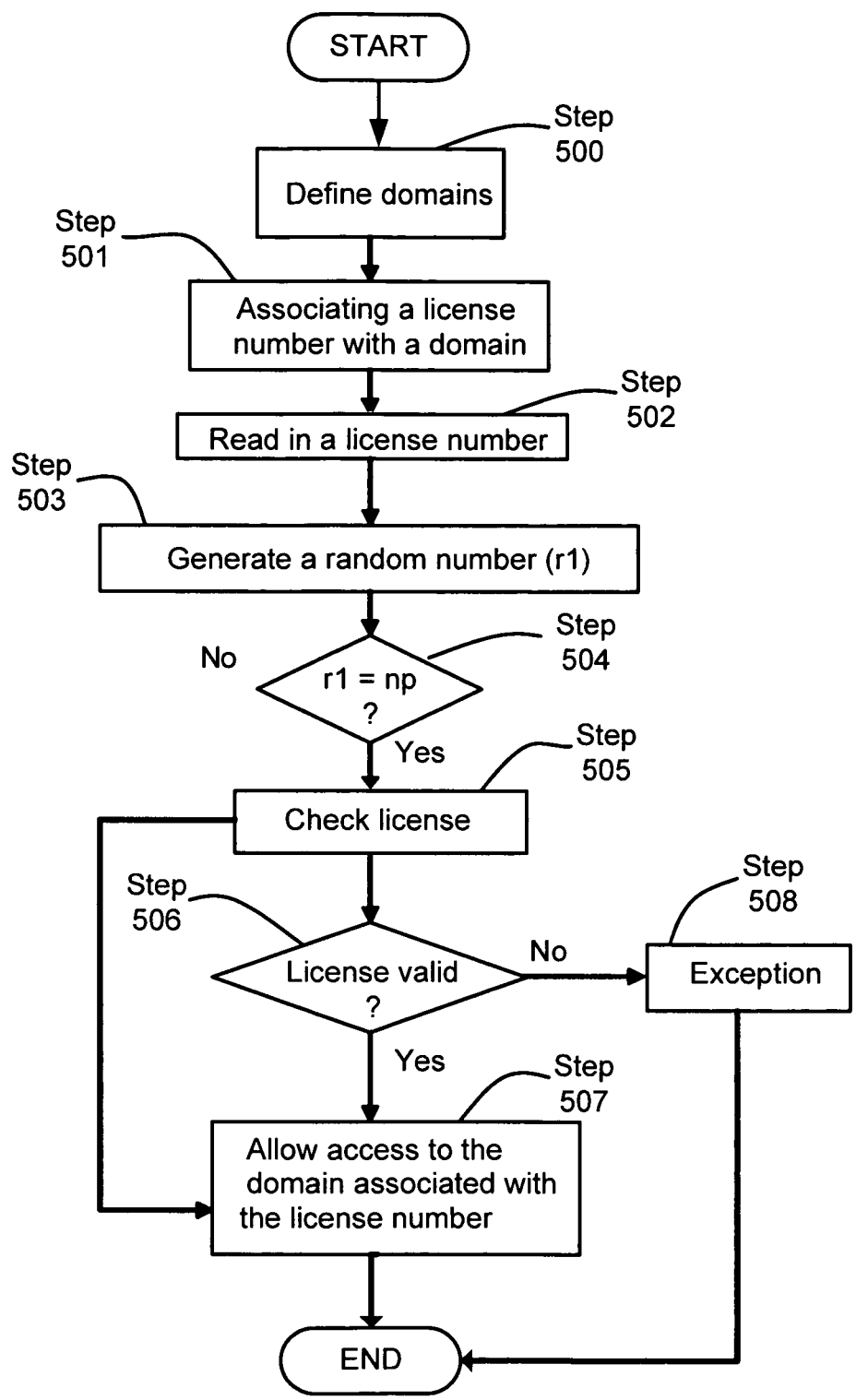
FIG. 5 shows a flow chart for statistical license checking in accordance with one or more embodiments of the invention.

FIG. 5 shows a flow chart for statistical license verification in accordance with one or more embodiments of the invention. Initially, domains are defined within the data store (Step 500). Next, each domain is associated with a license number (Step 501). When a probe attempts to access the data store, the license number is read from the probe (Step 502). A random number (r1) is generated (Step 503), and is compared with a pre-selected number (np) (Step 504). If r1 does not equal np, the process continues and an access to the domain corresponding to the read license number is allowed (Step 507). If r1 equals np (which happens at a probability of 1/np), then a license check is executed (Step 506). If the license checked in Step 506 is valid, the process continues and an access to the domain corresponding to the read license number is allowed (Step 507). If the license is not valid, then an exception is thrown (Step 508), and the user only obtains corrupted data from the domain selected.

An exception to the statistical license verification method described above includes using before-insert and before-update table triggers or an entity containing logics guaranteeing that the appropriate licenses are checked out. In other words, they do not use a statistical technique. The before-insert trigger generated for the Well_table is as follows:

```
CREATE OR REPLACE TRIGGER Well_InR
  before insert on Well_
  for each row
Declare
  v_UserName varchar2(30);
  v_Return_Lic PLS_Integer;
begin
  -- Licensing
  if BitAnd(SDS_Sys.SDS_Context.g_CheckedOut, 128) <> 128 then
    v_Return_Lic := SDS_Sys.SDS_Public.Check_License(128);
  end if;
  ...
end;
```

Initially, the SDS_Context.g_CheckedOut package variable is initialized to zero when the SDS_Context package is loaded. Hence, when any trigger is called for the first time, it must call the SDS_Public.Check_License function to check whether the required licenses are checked out. This function sets the appropriate bits of the package variable to indicate which licenses are checked out so that on subsequent invocations of any trigger in this session there is no need to make an expensive procedure call unless a new license is required. Hence, there is little impact on the performance from these triggers. If the required licenses cannot be checked out, the Check_License function throws an exception.

The SDS_Public.Check_License function is defined as follows:

```
function Check_License (
    License PLS_Integer)
    return PLS_Integer
  is
    v_Have PLS_Integer;
  Begin
    -- re-validate licenses periodically
    -- increment and return if not time to re-validate
    if g_ValidateTicker < g_ValidateTrigger then
      g_ValidateTicker := g_ValidateTicker + 1;
    else
      sds_oslm.Revalidate_License;
      g_ValidateTicker := 0;
    end if;
    -- return 1 (true) if we have the needed licenses
    v_Have := BitAnd(SDS_Sys.SDS_Context.g_CheckedOut, License);
    if v_Have = License then
      return 1;
    end if;
    -- Checkout the needed licenses (bits in License but not in v_Have)
    -- Get_License updates sds_CheckedOut table and
    -- SDS_Context.g_CheckedOut.
    -- Get_License returns on success and raises exception on failure.
    sds_oslm.Get_License(License – v_Have);
    return 1;
  end Check_License;
```

The Check_License function calls the SDS_OSLM.Get_License procedure to set the appropriate bits in the g_CheckedOut package variable to record which licenses that are checked out.

In one or more embodiments of the invention, the data repository runs a license daemon, which is a procedure to check licenses, in the system background. Procedures in the SDS_OSLM package use Oracle pipes to communicate to the license daemon for Oracle. The license daemon uses FLEXlm, a popular commercial license management tool made by Macrovision Corporation for checking licenses of applications (or a product with similar functionality), to manage licenses in a conventional way. The SDS_OSLM.Get_License procedure starts the license daemon if it is not already running. The SDS_OSLM.Revalidate_License procedure is invoked periodically from the Check_License function to confirm that the licenses purportedly checked out according to the g_CheckedOut package variable are indeed checked out by the daemon.

Domain Licensing on SQL Server

Domain licensing is implemented on SQL Server by adding an extra "license" argument to the procedure calls. The interface views generated on SQL Server are basically similar to the views generated on Oracle. However, there are a few complications because, as is well known in the art, SQL Server does not allow for procedures to be called from a view or side effects in functions. The view generated for the Well entity for the implementation on SQL Server is as follows:

```
create view Well_
with encryption as
select Id,
Insert_Date,
Insert_User,
...
UWI
  from dbo.Well_
  where 1 = (case Id & 127
  when RAND(127) then (case SDS_Sys.dbo.SDS_License_Check
  (s1,
  GetDate( ))
       when s2 then 1 else 1/0 end)
  else 1
  end)
```

The "where" clause in the above code contains additional logics for license checking. As described above in the case of Oracle, a statistical technique is used to check for the license approximately once of every 128 probes. However, for the Oracle implementation, the call to the function SDS_License_Check includes the value of the current time. This extra value is necessary because SQL Server does not allow GetDate to be called inside a function. The current time is used inside the SDS_License_Check function to determine whether a legitimate license daemon for SQL Service is running.

Figure 6:
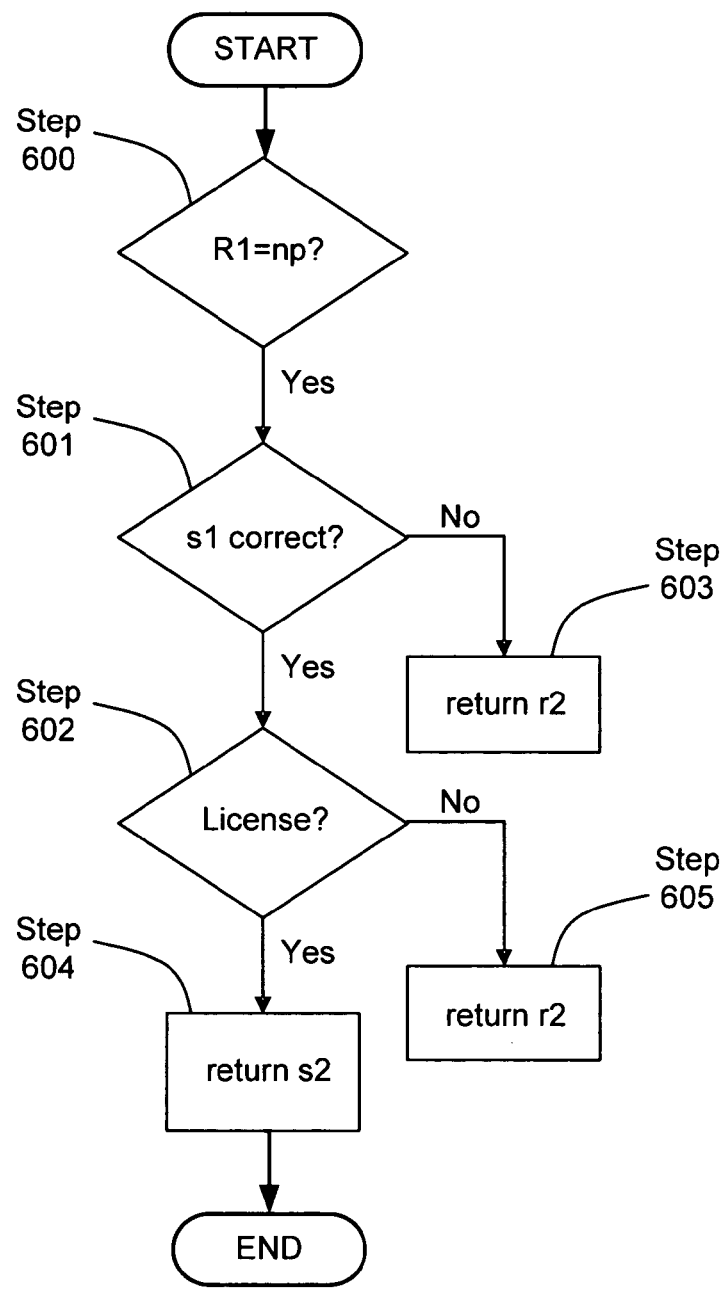
FIG. 6 shows a flow chart for controlling access to a database using secret numbers in accordance with one or more embodiments of the invention.

FIG. 6 shows a flow chart for controlling access to a database using secret numbers in accordance with one or more embodiments of the invention. Initially, a statistical sampling is performed (Step 600), which is the same as Step 504 of FIG. 5 (i.e., a random number (r1) is generated and is compared with a pre-selected number (np)). If the first argument to SDS_License_Check is not a secret number (s1) as checked in Step 601, then SDS_License_Check returns another random number (r2) as an output (Step 603); otherwise a license check is performed to determine whether the current session has a database license (Step 602). If the license check is okay, then the program returns a second number (s2) (Step 604); if not, another random number (r2) is returned (Step 605). The secret numbers (s1 and s2) are used to prevent someone from swapping out the SDS_License_Check function with a trivial forgery. The views are encrypted in the database. Therefore, there is no risk that the secret numbers are revealed. An advantage of this implementation is that a hacker does not realize that the access is denied by simply looking at the returned numbers.

If the SDS_License_Check function returns the value s2, the "where" in the above code segment evaluates to "true" and the proper results is returned from the select statement.

However, if the current session does not have a database license, then the "where" clause attempts to evaluate 1 divided by 0, which causes an exception to be thrown, and no value is returned from the select statement.

One skilled in the art will appreciate that the stored procedures that implement licensing on SQL Server are more complicated than the corresponding procedures on Oracle. This is because first, the procedures on SQL Server use the SDS_Key table in the SDS_Sys account to determine which licenses have been checked out as there are no package variables; second, no direct communication is attempted from a stored procedure in SQL Server to the License daemon. The license daemon reads from and writes to the SDS_Key table. The stored procedures only read from the SDS_Key table.

In one or more embodiments of the invention, the structure of the SDS_Key table is shown in the following query and result:

| select * from SDS_Sys.SDS_Key | | | |
|---|---|---|---|
| SPID | State | Key | Timestamp |
| 0 | 0 | 29414786 | 2004-09-09 14:15:02.930 |
| 52 | 1 | 19360917 | 2004-09-09 10:55:52.060 |
| 53 | 1 | 5238592 | 2004-09-09 10:55:52.310 |
| 54 | 1 | 17155521 | 2004-09-09 13:41:23.153 |
| 55 | 0 | 28882790 | 2004-09-09 14:02:18.260 |

The SPID column holds the server process ID of every non-system process that has a session on the SQL Server instance. The license daemon gets this information from the Master.SysProcesses table. In addition, there is a dummy entry with SPID=0 that is used specifically by the license daemon. The State has two values, 1 or 0. When the State=0, the session is not charged for a database license if the Key has the correct value. When the State=1, the session is charged for a database license if the Key has the correct value. The Timestamp refers to the time that the daemon inserted the entry into the SDS_Key table.

If the Key=−1, then the session does not need an access to a data store. If the Key=0, then the session is waiting for a database license to access a data store. Any sessions with a Key<=0 are denied access to a data store. If the Key is positive and has the same values as computed by a secret function KeyFn, then that session has the right to access the data repository entities. If the Key is positive but does not have the same value as computed from the KeyFn, then the entry is a forgery and the session is denied the access to the data repository.

KeyFn is a secret function and in some embodiments in accordance with the invention is based on the SPID and the Login_Time of the session. Hence, a hacker cannot forge Key values easily by looking at existing entries in the SDS_Key table.

The SDS_License_Check function is implemented as follows:

```
Create Function SDS_License_Check(@p_Secret float, @mytime
  datetime)
returns float
with encryption as
Begin
  Declare @v_key int, @v_found int, @v_Out float
  -- Get the key
  select @v_key = [key] from sds_sys.sds_key where
  spid=@@spid
```

-continued

```
  set @v_found = @@ROWCOUNT
  if @v_found = 0 or datepart (ms, @mytime) < 20
  Begin
    -- Check if the daemon is running
    set @v_Out = dbo.SDS_License_CheckDaemon(@p_Secret,
    @mytime)
    if @v_found = 0 or @v_Out <> s2
    return @v_Out
  End
  -- Check the key and secret number
  if @v_key > 0 and @p_Secret = s1
    return s2
  else
    return rand( )
End
```

If the first argument to the SDS_License_Check function or the SDS_License_CheckDaemon function is not s1, then a random number is returned as an output; otherwise, the value of s2 is returned for success and a random number is returned for failure. The two secret numbers s1 and s2 are used to prevent someone from swapping out these functions with a forged version. The functions that generate the secret numbers are encrypted in the database. Therefore, there is no risk that the secret numbers are revealed.

The SDS_License_Check function first tries to fetch the value of the key for the current session. If no entry is found, the function SDS_License_CHeckDaemon is called to ensure that a valid daemon is running. If no valid daemon is running and it is not possible to start one, the SDS_License_Check function returns a random number signifying a failure.

When a valid daemon is running normally, but if no SDS_Key entry is found, the function immediately returns a value signifying success thereby allowing the view to execute normally. In this embodiment, a view is always allowed to execute for the first few seconds while the license daemon makes a disposition. This approach is more user friendly compared with waiting for a new license daemon to start. This approach is also consistent with the use of a statistical approach for selections from the view. If an SDS_Key entry is found, checking continues.

After the SDS_Key entry is found, if Key>0 and the secret number is correct, the SDS_License_Check function returns a value signifying a success and allows the view to execute normally; otherwise, the function returns a random number signifying a failure that causes the view to throw an exception. There is no need to check if the Key has the same value as that computed from KeyFn. If the license daemon is running, it will detect a forged Key value and reset the Key to −1 (typically within two seconds). In this manner, the daemon can keep track of attempted forgeries. Most of the time the SDS_License_Check function does very little work except when checking if the Key is positive and if the secret number is correct.

The SDS_License_CheckDaemon function checks if a valid license daemon is running and if not, the function tries to start a valid license daemon. In order to make the test efficient, the following technique is implemented in some embodiments in accordance with the present invention. Periodically (for example, once every 2 seconds), the license daemon updates the Key and the Timestamp of the SDS_Key table for the entry with SPID=0. It uses a secret function DaemonFn to compute the Key from the Timestamp. The SDS_License_CheckDaemon function checks whether the Timestamp is recent (within the last 10 seconds), and also checks if the Key has the same value as that computed from DaemonFn. If so, a legitimate license daemon is running. If not, a procedure is invoked to start a new license daemon.

The license daemon looks periodically for new entries in the SysProcesses table. The Timestamp in the SDS_Key table is compared with the Login_Time in the SysProcesses table to make sure that an entry is new. This is due to the fact that SQL reuses SPIDs. If the daemon discovers a stale entry in the SDS_Key table (Timestamp<Login_Time), it deletes the entry. If the Key is positive and the State is 1, the daemon indicates that a database license was previously checked out and subsequently calls FLEXlm (or a product with similar functionality) to check the database license back in.

When a new session is discovered, if the daemon is able to check out a new database license from FLEXlm (or a product with similar functionality), then a new entry is inserted into the SDS_Key table with State=1 and with the Key computed using KeyFn. If the daemon is unable to checkout a new database license, it inserts a new entry with State=1 and with Key=0 to indicate that the session is waiting for a database license.

The after-insert and after-update table triggers for an entity contain logic that guarantees the appropriate licenses being checked out. Without checking out appropriate licenses, these triggers throw an exception without using a statistical technique. The following is an exemplary code for an insert trigger for the Well_table:

```
Create TRIGGER Well_In ON dbo.Well_AFTER INSERT
with encryption as
BEGIN
  declare @v_Key int, @v_MyTime DateTime, @v_Out float
  select @v_Key = [Key], @v_MyTime = Current_Timestamp
    from SDS_SYS.dbo.SDS_Key where SPID = @@SPID
  if @@RowCount = 0
  begin
    exec SDS_Sys.dbo.SDS_License_Wait
    if @@Error <> 0
    begin
      if @@TranCount > 0
        Rollback
      RaisError('No SDS Database License',16,1)
    end
    else
    begin
      if @@Idle & 127 = 0
      begin
        -- Check if the daemon is running
        set @v_Out = SDS_Sys.dbo.SDS_License_CheckDaemon
                       s1, @v_MyTime
        if @v_Out <> s2
          set @v_Key = -1
      end
      -- Check the key
      if @v_Key <= 0
      begin
        if @@TranCount > 0
          Rollback
        RaisError('No SDS Database License',16,1)
      end
    end
    ...
END
```

First, the trigger attempts to fetch the Key and the current time for the current session. If there is no entry yet in the SDS_Key table, the trigger calls the procedure SDS_License_Wait to wait until a license is acquired. Once a database license is acquired, execution of the trigger continues. Otherwise, if there is an error because no license is acquired, then the transaction is rolled back and an exception is raised.

If an SDS_Key entry is found, then a statistical spot check is made to ensure that the license daemon is running. If the license daemon is not running, then the @v_Key variable is reset to −1 to cause a failure. If @v_Key<=0, then the trigger causes a rollback and exception. If @v_Key>0, then execution of the trigger continues. For most of the time, the trigger does very little work except when checking that the value of the Key is positive. The triggers are encrypted in the database to protect the secret numbers.

Embedded Application Licensing

Third party applications running on the data repository generally require an application FLEXlm (or a product with similar functionality) license. Even with such a license, an anonymous application does not have access to data stores unless the application also has a (separate) database license. In some embodiments of the invention, third party applications can access data stores without a database license, but are required to have an embedded license.

To request an embedded license for a third party application, the application manager must give the administrator the FLEXlm (or a product with similar functionality) feature name used to license the application. The administrator adds the feature name to a small C# file or/and a Java file in a manner know to those skilled in the art. After compiling these file(s), the data repository commercialization group provides the requestor a Dynamic Link Library (DLL) file for use from C# or/and an obfuscated Java Archive (JAR) file for use from Java. The DLL file for creating a link from a Windows application to a library of executable functions. The DLL/JAR file(s) must be linked with the application so that the application can call the data repository embedded licensing Application Program Interface (API).

The embedded licensing API is used to check out and check in the application license. As a side effect, it also requires or relinquishes an embedded database license to the data repository.

An exemplary code segment for making a call to check out a license is shown below:

```
// To check out a license
try {
// Initialize the manager
  LicenseManager mgr = new LicenseManager( );
// Get the component
  LicensedComponent comp = mgr.getLicensedComponent(featureName,
    Version);
// Checkout the feature
  comp.checkOut(dbConnection);
} catch(LicenseException le) {
  ...
}
```

In the case of C#, one skilled in the art will appreciate that the dbConnection refers to an OleDbConnection, and that, in the case of Java, it refers to a JDBC connection. That is, the application must start a session before requesting an embedded license. If the application has already checked out its own application license, the call to the embedded licensing API does not check out a second license.

The exemplary code segment to make a call to check in a license that was checked out earlier is shown below:

```
try {
    comp.checkIn( );
} catch(LicenseException le){
    ...}
```

In one or more embodiments of the invention, the DLL/JAR file only works for application licenses that have been registered. If the third party gives the DLL/JAR file to a fourth party, the file is useless without the fourth party's own application license. That is, no embedded database license is granted without successfully checking out a registered application license.

The techniques used to implement the embedded licensing API for Oracle and SQL Server is described below. One skilled in the art will appreciate that the implementation described below may be performed in a similar fashion on any database platform or management system (e.g., Sybase, Informix, DB2, Oracle, SQL Server, or other similar DBMS).

Figure 7:
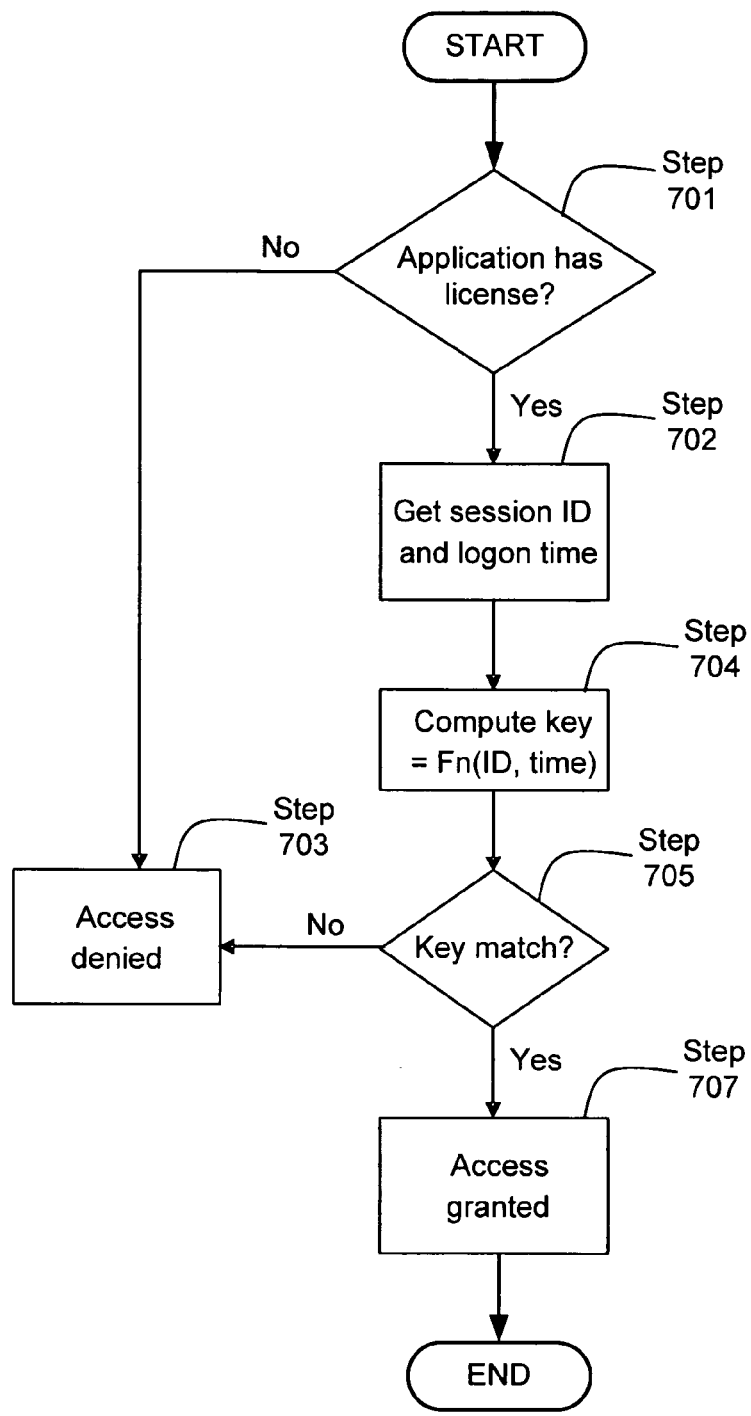
FIG. 7 shows a flow chart for an embedded licensing methodology in accordance with one or more embodiments of the invention.

FIG. 7 shows a flow chart for an embedded licensing methodology in accordance with one or more embodiments of the invention. After the initial registered application license check (Step 701), the checkout procedure in the DLL/JAR file calls the public procedure SDS_Public.Get_Session_Info to get the session ID and the Logon_Time of the session (from SYS.V$Session) (Step 702). Next, the procedure computes a key using the secret function EmbeddedFn based on the session ID and the Logon_Time (Step 704). Then, the procedure passes the key to the public procedure SDS_Public.Get_License, which in turn passes the key to SDS_OSLM.Get_License.

If the computed key matches the key passed in (Step 705), then the embedded license is granted and the checkout procedure sets all of the bits in the g_CheckedOut package variable to 1 (Step 707). This means that the current session has access to all data model domains in any data store for which it has been granted privileges. Otherwise, access is denied (Step 703).

One skilled in the art will appreciate that no communication with the license daemon for Oracle is required because there is no need to check out a database license from FLEXlm (or a product with similar functionality).

Further, one skilled in the art will appreciate that for SQL Servers, the checkout procedure in the DDL/JAR file uses a secure view to insert a new record or update the existing record for the current session in the SDS_Key table. All users have privileges to insert and update the Key through this view, but the instead-of triggers ensure that the State is 0 and that the SPID is that of the current session.

The checkout procedure computes a key using the secret function EmbeddedFn. The computed key is stored in the SDS_Key table but the value 0 is stored for the State. This is the signal to the license daemon that the current session is requesting an embedded license.

The license daemon periodically checks all the entries in the SDS_Key table. If the recorded value of the Key is −1, then the entry is ignored because it does not have access to a data store and it has not been "charged" for a database license. A recorded value of the Key=0 indicates that the session is waiting for a database license. If a database license is available from FLEXlm (or a product with similar functionality), the daemon checks out the license, computes a key using KeyFn and updates the Key value in the SDS_Key table.

When the Key is positive, then if the State is 0, the daemon computes a key using EmbeddedFn; if the State is 1, then the daemon computes a key using KeyFn. If the recorded Key does not match the computed key, then the SDS_Key entry for this session is forged and the daemon resets the Key to −1 in order to prevent further access to data stores. If the keys match, then the session is charged for a database license only when the State is 1. The daemon guarantees that the number of licenses checked out using FLEXlm (or a product with similar functionality) is always consistent with the current state of the SDS_Key table.

Again, while database licensing methods in accordance with embodiments of the present invention have been illustrated based on implementations in a special-purpose data repository, which in turn is based on commercial DBMS Oracle and SQL Server, other data repositories or DBMS in the art or subsequently developed, may also take advantage of these database licensing methods.

Embodiments of the present invention may be implemented with various computers, such as workstations, PCs, laptops, servers, and supercomputers. Further, the invention may be implemented on virtually any type of computer regardless of the platform being used. For example, a computer system includes a processor, associated memory, a storage device, and numerous other elements and functionalities typical of today's computers (not shown). The computer system may also include input means, such as a keyboard and a mouse, and output means, such as a monitor. The computer system is connected to a local area network (LAN) or a wide area network (e.g., the Internet) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Software instructions to perform embodiments of the invention may be stored on a computer readable medium such as a compact disc (CD), a diskette, a tape, a file, or any other computer readable storage device. Furthermore, various memories (or storage means) may be used to store programs having instructions for performing the techniques of the present invention. The program of instructions may be in object code or source code. The precise form of the program storage device and of the encoding of instructions is immaterial for the purposes of this invention.

Advantages of the present invention include, but are not limited to, flexible licensing by domains makes accessing a data repository more affordable, statistical license check methods increasing the speed to access the data repository and more particularly make domain licensing possible, allowing embedded application licensing also increases system flexibility and better separates intellectual property values in an application product from those in a data repository. These features may be particularly beneficial to oil and gas industry applications.

While the invention has been described with respect to a limited number of embodiments, those skilled in the art, having benefit of this disclosure, will appreciate that other embodiments can be advised which do not depart from the scope of the invention as disclosed herein. Accordingly, the scope of the invention should be limited only by the attached claims.

What is claimed is:

1. A method for managing access to a data store having a plurality of domains, comprising:
   obtaining a data model defining an entity type;
   generating, using a hardware processor, a plurality of meta-tables based on the data model and defining the data store;
   generating, using the hardware processor, the data store having the plurality of domains based on the plurality of meta-tables, wherein the plurality of domains comprises a plurality of data items for the entity type;
   receiving, from a user, a request to generate a view for the entity type, wherein generating the view requires accessing the plurality of data items in the plurality of domains;
   obtaining, in response to the request, a package variable identifying a checked out license of the user;
   obtaining a plurality of domain license numbers identifying the plurality of domains, wherein each of the plurality of domain license numbers is a power of two and identifies a domain of the plurality of domains;
   determining, using the hardware processor, a single license value identifying all of the plurality of domains after receiving the request by summing the plurality of domain license numbers, wherein each of the plurality of domains is represented by a bit in the single license value;
   generating a result by performing a bitwise AND operation between the single license value and the package variable identifying the checked out license of the user;
   calculating, using the hardware processor, a missing license for the user by subtracting the result from the single license value;
   acquiring, using the hardware processor, the missing license for the user; and
   generating, for the user, the view for the entity type by accessing the plurality of domains after acquiring the missing license.

2. The method of claim 1, further comprising checking a validity of the checked out license, wherein checking the validity comprises using a statistical sampling method.

3. The method of claim 2, wherein checking the validity further comprises:
   comparing an input argument from the user with a first secret number generated by a licensing service;
   if the input argument matches the first secret number, then executing a license check; and
   if the license is valid, then returning a second secret number.

4. The method of claim 3, wherein the input argument from the user is generated using a first code possessed by the user, wherein the first secret number is generated using a second code in the licensing service.

5. The method of claim 4, wherein the first code and the second code share a common algorithm.

6. The method of claim 1, further comprising:
   assigning a license management tool feature name to a third party application;
   adding the license management tool feature name to a code in the data store;
   starting a user session of the third party application;
   requesting the third party application to call an embedded licensing application program interface; and
   checking the checked out license using the embedded licensing application program interface.

7. The method of claim 1, further comprising:
   setting a bit in the package variable corresponding to the missing license after acquiring the missing license.

8. The method of claim 1, wherein acquiring the missing license comprises forwarding the missing license to a license daemon.

9. A non-transitory computer readable medium, having stored thereon, instructions that when executed by a computing device, cause the computing device to perform operations comprising:
   obtaining a data model defining an entity type;
   generating a plurality of meta-tables based on the data model and defining the data store;
   generating the data store having the plurality of domains based on the plurality of meta-tables, wherein the plurality of domains comprises a plurality of data items for the entity type;
   receiving, from a user, a request to generate a view for the entity type, wherein generating the view requires accessing the plurality of data items in the plurality of domains;
   obtaining, in response to the request, a package variable identifying a checked out license of the user;
   obtaining a plurality of domain license numbers identifying the plurality of domains, wherein each of the plurality of domain license numbers is a power of two and identifies a domain of the plurality of domains;
   determining a single license value identifying all of the plurality of domains after receiving the request by summing the plurality of domain license numbers, wherein each of the plurality of domains is represented by a bit in the single license value;
   generating a result by performing a bitwise AND operation between the single license value and the package variable identifying the checked out license of the user;
   calculating a missing license for the user by subtracting the result from the single license value;
   acquiring the missing license for the user; and
   generating, for the user, the view for the entity type by accessing the plurality of domains after acquiring the missing license.

10. The non-transitory computer readable medium of claim 9, the operations further comprising checking the validity of the checked out license, wherein checking the validity comprises using a statistical sampling method.

11. The non-transitory computer readable medium of claim 10, wherein checking the validity further comprises:
    compare an input argument from the user with a first secret number generated by a licensing service;
    if the input argument matches the first secret number, then execute a license check; and
    if the license is valid, then return a second secret number.

12. The non-transitory computer readable medium of claim 11, wherein the input argument from the user is generated using a first code possessed by the user, and wherein the first secret number is generated using a second code in the licensing service.

13. The non-transitory computer readable medium of claim 12, wherein the first code and the second code share a common algorithm.

14. The non-transitory computer readable medium of claim 9, wherein the operations further comprises:
    assigning a license management tool feature name to the third party application;

adding the license management tool feature name to a code in the data store;

starting a user session of the third party application;

requesting a third party application to call an embedded licensing application program interface; and checking a license using the embedded licensing application program interface.

15. The non-transitory computer readable medium of claim 9, wherein the operations further comprises:

setting a bit in the package variable corresponding to the missing license after acquiring the missing license.

16. The non-transitory computer readable medium of claim 9, wherein the instructions for acquiring the missing license further comprise functionality to forward the missing license to a license daemon.

17. A system to manage access to a data store having a plurality of domains, comprising:

a hardware processor; and a memory storing instructions for executing on the hardware processor to perform the steps of:

obtaining a data model defining an entity type;

generating a plurality of meta-tables based on the data model and defining the data store;

generating the data store having the plurality of domains based on the plurality of meta-tables, wherein the plurality of domains comprises a plurality of data items for the entity type;

receiving, from a user, a request to generate a view for the entity type, wherein generating the view requires accessing the plurality of data items in the plurality of domains;

obtaining, in response to the request, a package variable identifying a checked out license of the user;

obtaining a plurality of domain license numbers identifying the plurality of domains, wherein each of the plurality of domain license numbers is a power of two and identifies a domain of the plurality of domains;

determining a single license value identifying all of the plurality of domains after receiving the request by summing the plurality of domain license numbers, wherein each of the plurality of domains is represented by a bit in the single license value;

generating a result by performing a bitwise AND operation between the single license value and the package variable identifying the checked out license of the user;

calculating a missing license for the user by subtracting the result from the single license value;

acquiring the missing license for the user; and generating, for the user, the view for the entity type by accessing the plurality of domains after acquiring the missing license.

18. The system of claim 17, wherein the memory stores further instructions for executing on the hardware processor to perform the step of checking the validity of the checked out license, wherein checking the validity comprises using a statistical sampling method.

19. The system of claim 18, wherein the instructions to perform the step of checking the validity further comprise:

comparing an input argument from the user with a first secret number generated by a licensing service;

if the input argument matches the first secret number, then executing a license check; and if the license is valid, then returning a second secret number.

20. The system of claim 19, wherein the input argument from the user is generated using a first code possessed by the user, wherein the first secret number is generated using a second code in the licensing service.

* * * * *